Patented Mar. 15, 1938

2,111,236

UNITED STATES PATENT OFFICE 2,111,236

RECOVERY OF BARIUM FROM BLACK ASH RESIDUES

Robert W. Ball, Kaolin, Pa., assignor to E. I. du Pont de Nemours & Company, Wilmington, Del., a corporation of Delaware No Drawing. Application February 7, 1936, Serial No. 62,812

6 Claims. (Cl. 23—90)

This invention relates to the recovery of valuable barium compounds from heretofore worthless black ash residues, and is more particularly directed to processes wherein the barium values in black ash residues are rendered soluble by calcining the black ash residues in the presence of steam.

In processes for making blanc fixe, lithopone, and other barium-containing compounds, it is common practice to calcine a mixture of powdered barytes and powdered coal at a high temperature and to leach out the water-soluble barium salts, consisting mainly of barium sulfide. The residue or "mud", known as black ash residue, is discarded, and it usually accumulates in a large pile, amounting to little more than a nuisance.

The black ash residue contains a small amount of water-soluble barium salts, a considerable amount (20-35%) of barium salts soluble in dilute hydrochloric acid, a considerable amount (15-30%) of barium salts which are insoluble in dilute hydrochloric acid, and a considerable amount (10-20%) of carbonaceous material. The remainder is substantially silica, $SiO_2$, alumina, $Al_2O_3$, and iron oxide, $Fe_2O_3$, either as such or combined in various ways with each other and with the barium salts. Among the acid-soluble barium salts present are considerable amounts of complex polysulfides which on acidification give free colloidal sulfur that is difficult to remove economically.

In this condition, black ash residue has been considered practically worthless, because the barium compounds could not be extracted without using other chemicals, heat, and power to such an extent that the cost would be greater than the value of the barium salts recovered.

This invention has for an object the provision of economical processes for converting acid-insoluble barium compounds to an acid-soluble form. It is a further object of this invention to provide simple and economical processes for the conversion of acid-insoluble barium compounds in black ash residues to acid-soluble and sulfur-free form. Further objects will become apparent hereinafter.

I have found that these objects can be accomplished by calcining black ash residues at a high temperature in the presence of steam. The barium values may then be leached out with a suitable dilute acid, preferably hydrochloric. In addition to its simplicity and economy, this procedure avoids the formation of any substantial amount of colloidal sulfur.

At temperatures above about 700° C. in the presence of an atmosphere containing at least about 20% steam, the acid-insoluble barium compounds are transformed to an acid-soluble state. This may be attributable to a breakdown of sulfates, sulfides, aluminates, ferrites, etc., by the silica present to form barium silicate, or to the formation from these products of barium hydrate or barium oxide. The reaction products, whatever their composition, are soluble in dilute hydrochloric acid. Substantially all of the sulfur present is driven off during the calcination in the form of sulfur dioxide. By the use of my processes, as much as 99.6% of the barium present in the black ash residues has readily been recovered in sulfur-free form.

While temperatures not substantially lower than about 700° C. effect the results of this invention, it is usually preferred to use temperatures not substantially lower than about 900° C. The upper temperature limit is determined largely by economical and practical considerations. Temperatures as high as 1200° C. have been used with great success.

My preferred process comprises heating the barium-containing residues in an atmosphere containing no less than about 20% steam to a temperature between about 700° C. and 1100° C. long enough to effect the desired conversion, say from three to eight hours, or until sulfur dioxide stops coming off. Subsequently leaching the calcined material with sufficient dilute hydrochloric acid serves to remove the barium as barium chloride. For economic reasons, it is preferable to use only a slight excess of acid over the theoretical amount required.

The following specific example is given more completely to illustrate the practice of my invention:

Black ash residue was wet ground in a pebble mill, filtered, dried, broken up to pass a 60-mesh screen, and charged into a slowly-rotating refractory kiln. The heat was started, bringing the charge to 1100° C. in two hours. The temperature was held at 1100° C. for four hours, and then the heat was turned off and the charge allowed to cool. During the heating and until the charge cooled to 900° C. after the heat was turned off, steam was introduced steadily in sufficient amount to maintain the steam content of the atmosphere of the kiln at about 25%. After the charge cooled, it was ground to pass a 40-mesh screen, placed in a wooden tank with 25 parts of HCl and 500 parts of water per 100 parts of calcined material, and the whole agitated thoroughly until the soluble barium was leached out. The residue was then filtered out and discarded, and the resulting filtrate, essentially a solution of barium chloride, was ready for use for purposes well known in the art.

While the procedure outlined in the above example leads to excellent results, it will be understood that I do not intend to be limited thereby and that one skilled in the art may readily modify the procedure without departing from the spirit of my invention. The grinding of the material can be effected in numerous ways and in varying degrees, or it can be omitted. Various types of furnace and modes of heating may obviously be employed, and the time and temperature of heating may be varied to suit the specific character of the black ash residues used.

It will also be understood that while my invention is primarily concerned with the recovery of acid-insoluble barium values from black ash residues, other materials similar in composition would be equivalent and could advantageously be treated in a similar manner.

I claim:

1. In a process for the treatment of black ash residues from barium sulfate reduction, the step comprising calcining the residue at a temperature of at least 700° C. in the presence of steam to convert acid-insoluble barium values to acid-soluble form.

2. In a process for the treatment of black ash residues from barium sulfate reduction, the step comprising calcining the residue at a temperature of at least 900° C. in the presence of steam to convert acid-insoluble barium values to acid-soluble form.

3. In a process for the treatment of black ash residues from barium sulfate reduction, the step comprising calcining the residue at a temperature of at least 700° C. in the presence of an atmosphere containing at least 20% steam to convert acid-insoluble barium values to acid-soluble form.

4. In a process for the treatment of black ash residues from barium sulfate reduction, the step comprising calcining the residue at a temperature between 700° and 1100° C. in the presence of an atmosphere containing at least 20% steam to convert acid-insoluble barium values to acid-soluble form.

5. In a process for the treatment of black ash residues from barium sulfate reduction, the steps comprising calcining the residue at a temperature between 700° and 1100° C. in the presence of an atmosphere containing at least 20% steam to convert acid-insoluble barium values to acid-soluble form, and leaching the calcined material with dilute hydrochloric acid to obtain a solution of the barium values.

6. A process for treating barium-containing residual mixtures to convert the acid-insoluble barium compounds present therein to sulfur-free acid-soluble compounds, comprising calcining said residual mixtures at a temperature ranging from substantially 700 to 1100° C. in the presence of an atmosphere of steam, leaching the calcined product with a dilute acid and recovering the barium values from the solution obtained.

ROBERT W. BALL.